United States Patent
Phinney

[19]
[11] Patent Number: 6,132,484
[45] Date of Patent: Oct. 17, 2000

[54] WET GRANULATION METHOD FOR GENERATING FERTILIZER GRANULES

[75] Inventor: Robin Phinney, Calgary, Canada

[73] Assignee: Airborne Industrial Minerals Inc., Calgary, Canada

[21] Appl. No.: 09/061,188

[22] Filed: Apr. 17, 1998

[51] Int. Cl.[7] .............................. C05C 1/00; C05D 1/00; C05G 5/00; A01N 25/00; A01N 25/12

[52] U.S. Cl. ........................ 71/31; 71/54; 71/58; 71/59; 71/60; 71/61; 71/63; 71/64.01; 71/64.02; 71/64.03; 71/64.05; 71/64.13; 23/313 P; 23/313 R; 23/293 S

[58] Field of Search ............................. 23/313 P, 313 R, 23/293 S; 71/58, 59, 60, 61, 63, 64.01, 64.02, 64.03, 64.05, 64.13, 54, 31; 425/222; 264/117

[56] References Cited

U.S. PATENT DOCUMENTS

| | | | |
|---|---|---|---|
| H001070 | 7/1992 | Harrison et al. ........................... | 23/313 |
| 2,741,545 | 4/1956 | Nielsson ..................................... | 71/28 |
| 3,206,528 | 9/1965 | Coombs et al. ......................... | 264/117 |
| 3,423,171 | 1/1969 | Hoppe et al. .............................. | 23/313 |
| 3,429,657 | 2/1969 | George et al. ............................. | 23/63 |
| 3,436,175 | 4/1969 | Atwood et al. ............................ | 23/119 |
| 3,528,767 | 9/1970 | Garrett ........................................ | 23/89 |
| 3,533,776 | 10/1970 | Coates et al. ............................... | 71/28 |
| 3,536,475 | 10/1970 | Trub ............................................. | 75/3 |
| 3,539,326 | 11/1970 | Eiji Otsuka et al. ....................... | 71/28 |
| 3,578,399 | 5/1971 | Boeglin ..................................... | 23/121 |
| 3,617,243 | 11/1971 | Neitzel ....................................... | 71/63 |
| 3,635,691 | 1/1972 | Earl . | |
| 3,656,891 | 4/1972 | Chemtob .................................... | 23/59 |
| 3,687,639 | 8/1972 | Barlow et al. ............................ | 23/300 |
| 3,711,254 | 1/1973 | McGowan et al. ....................... | 23/313 |
| 3,728,438 | 4/1973 | Nasyrov ................................... | 423/551 |
| 3,785,796 | 1/1974 | Mann, Jr. . | |
| 3,808,051 | 4/1974 | Schoenholz et al. ...................... | 134/2 |
| 3,843,772 | 10/1974 | Boeglin .................................... | 423/551 |
| 3,853,490 | 12/1974 | Boeglin et al. ............................ | 23/313 |
| 3,928,015 | 12/1975 | Siegel et al. ................................ | 71/28 |
| 3,967,930 | 7/1976 | Sadan ........................................ | 23/296 |
| 3,983,211 | 9/1976 | Nasyrov et al. ......................... | 423/128 |
| 3,984,521 | 10/1976 | Nasyrov et al. ......................... | 423/120 |
| 3,998,935 | 12/1976 | Adams et al. ............................ | 423/552 |
| 4,045,543 | 8/1977 | Sardisco ................................... | 423/482 |
| 4,116,848 | 9/1978 | Schoenholz et al. ...................... | 252/90 |
| 4,129,642 | 12/1978 | Neitzel ...................................... | 423/199 |
| 4,131,668 | 12/1978 | Sasaki et al. ........................... | 264/40.4 |

(List continued on next page.)

FOREIGN PATENT DOCUMENTS

| | | | |
|---|---|---|---|
| 2214145 | 3/1996 | Canada ............................ | C05C 3/00 |
| 2151569 | 12/1996 | Canada .............................. | B01J 2/30 |
| 0 289 074 A1 | 11/1988 | European Pat. Off. ........ | C05C 13/00 |
| 0 748 651 A1 | 12/1996 | European Pat. Off. .......... | B01J 2/14 |
| 1383110 | 2/1975 | United Kingdom .......... | C07C 126/08 |
| WO 97/39826 | 10/1997 | WIPO ............................... | B01J 2/14 |

OTHER PUBLICATIONS

"Advanced Fertilizer and Industrial Mineral Technology", Solterra Minerals Inc.

*Primary Examiner*—Steven P. Griffin
*Assistant Examiner*—Eileen E. Nave
*Attorney, Agent, or Firm*—Paul S. Sharpe; Marks & Clerk

[57] ABSTRACT

A method of wet granulation of fertilizer and other materials into granules. The method involves formation of the granule directly on the pan from the feedstock without intermediate steps or the use of seed materials. The result is a product having a completely uniform cross section. The feedstock is initially in the size distribution of –150 mesh with 90% or greater in the size range of 200 mesh. Moisture is maintained to facilitate a steady process without cycling. The method has the advantage of allowing granulation of materials either known to be hazardous or inherently difficult to granulate in a safe and expedient manner.

21 Claims, 6 Drawing Sheets

U.S. PATENT DOCUMENTS

| | | | |
|---|---|---|---|
| 4,142,885 | 3/1979 | Heumann et al. . | |
| 4,174,382 | 11/1979 | Menche | 423/552 |
| 4,175,943 | 11/1979 | Jordaan et al. | 71/29 |
| 4,183,738 | 1/1980 | Carmon | 71/50 |
| 4,215,100 | 7/1980 | Sokolov et al. | 423/552 |
| 4,264,543 | 4/1981 | Valenta | 264/37 |
| 4,268,492 | 5/1981 | Sardisco et al. | 423/482 |
| 4,303,619 | 12/1981 | Kobayashi et al. | 422/205 |
| 4,323,386 | 4/1982 | Heggebo et al. | 71/35 |
| 4,330,319 | 5/1982 | Bexton et al. . | |
| 4,334,906 | 6/1982 | Young | 71/33 |
| 4,342,737 | 8/1982 | Iwashita et al. | 423/522 |
| 4,344,747 | 8/1982 | Henry | 425/140 |
| 4,371,481 | 2/1983 | Pollock | 264/15 |
| 4,371,512 | 2/1983 | Sardisco et al. | 423/551 |
| 4,385,920 | 5/1983 | Dancy et al. | 71/36 |
| 4,420,468 | 12/1983 | Yamashita et al. | 423/482 |
| 4,436,710 | 3/1984 | Miyazaki et al. | 423/552 |
| 4,451,439 | 5/1984 | Maurel et al. | 423/55 |
| 4,528,039 | 7/1985 | Rubin et al. | 134/2 |
| 4,533,536 | 8/1985 | Bichara et al. | 425/551 |
| 4,554,004 | 11/1985 | Bierman et al. | 71/29 |
| 4,554,151 | 11/1985 | Worthington et al. | 423/551 |
| 4,562,058 | 12/1985 | Dancy et al. | 423/551 |
| 4,588,573 | 5/1986 | Worthington et al. | 423/552 |
| 4,589,904 | 5/1986 | Harrison et al. . | |
| 4,610,715 | 9/1986 | Monaldi et al. | 71/28 |
| 4,668,242 | 5/1987 | Vitellaro et al. | 23/313 |
| 4,707,347 | 11/1987 | Vajna et al. | 423/552 |
| 4,943,308 | 7/1990 | Vanmarcke et al. . | |
| 5,108,481 | 4/1992 | Shutt | 71/61 |
| 5,112,379 | 5/1992 | Young . | |
| 5,124,104 | 6/1992 | Holley | 264/113 |
| 5,152,821 | 10/1992 | Walter . | |
| 5,177,008 | 1/1993 | Kampen | 435/139 |
| 5,177,009 | 1/1993 | Kampen | 435/139 |
| 5,298,050 | 3/1994 | McLaughlin et al. | 71/63 |
| 5,322,532 | 6/1994 | Kurtz | 51/293 |
| 5,330,552 | 7/1994 | Rizzo | 71/30 |
| 5,366,534 | 11/1994 | Fischbein et al. | 71/63 |
| 5,378,259 | 1/1995 | Bassetti et al. . | |
| 5,383,951 | 1/1995 | Cross et al. . | |
| 5,460,765 | 10/1995 | Derdall et al. | 264/117 |
| 5,529,764 | 6/1996 | Lampert et al. | 423/552 |
| 5,549,876 | 8/1996 | Zisner et al. | 423/199 |
| 5,552,126 | 9/1996 | Efraim et al. | 423/199 |
| 5,571,303 | 11/1996 | Bexton . | |
| 5,603,745 | 2/1997 | Pettersen et al. | 71/58 |
| 5,624,649 | 4/1997 | Gal | 423/243.11 |

WET GRANULATION METHOD FOR GENERATING FERTILIZER GRANULES

FIELD OF THE INVENTION

The present invention relates to a pan granulation method for pan granulating pellets or granules and more particularly, the present invention relates to a wet granulation method for granulating fertilizer and other materials into industrially useful pellets or granules.

BACKGROUND OF THE INVENTION

One of the greatest limitations existing in the granulation art is centered on the fact that known processes require a seeding agent in order to achieve the proper conditions for material accretion to result in a pellet or granule. By making use of a seed, the resulting granule is adversely affected in two key properties; roundness and cross sectional uniformity. Typically, seeding material is not round and as the precursor particle, the result is irregular initial feedstock accretion which, in turn, forms an out-of-round particle upon which further material accretes. A further detriment from this results in terms of nonuniform particle density.

Methodology is required for synthesizing a granule in the absence of seed material and which is round, tightly packed with a uniform homogeneous cross section and capable of eliminating hazards associated with fertilizer granule production.

One of the latest issued patents in the art to which the present invention relates is U.S. Pat. No. 5,460,765, issued to Derdall et al., Oct. 24, 1995. The reference teaches a process for pan granulating a particulate material. Based on the teachings of the Derdall et al. reference, a final particle size distribution that is achievable by practicing the invention is between about −5 mesh to about +10 mesh. In order to initiate the process, the Derdall et al. process is limited to the introduction of a seeding material typically between about −14 mesh and +28 mesh. This is required in order to control the granule growth and as indicated in the Derdall et al. disclosure, seed minimizes mutual agglomeration and results in high yields being obtained. The Derdall et al. reference further indicates that the proper sizing of the seed is fundamental to the operation of the process for granulation in order to have product yields exceed 90%. Reference is made in the disclosure that a seed core in the range of −14 mesh to +35 mesh is required in order to achieve a steady state and maintain uniform size distribution of between −8 mesh to +6 mesh.

The Derdall et al. process, although a meritorious procedure, did not recognize the limitations of employing a seeding agent or the need for controlling the dust generated during granulation which not only creates an unhealthy environment for workers, but more seriously, results in a potentially explosive environment. This is evident from the teachings of Derdall et al., particularly at column 3, beginning at line 24, wherein it is stated:

"It may be more difficult to keep the granulation steady or stable with fine seed, such as −35 mesh."

The difficulty to which the Derdall et al. disclosure alludes is directed to cycling which is an inherent problem with pan granulation processes. If the size distribution of the seeding agent is not constant, then the process will not stabilize and effectively "cycles" as is known to those skilled in this art. The result of this is that larger formed granules on the pan effectively destroy the smaller particles. This, of course, defeats the purpose of the pan granulation to generate particles.

Furthermore, at line 36 in column 3, the disclosure indicates that:

"Fine seed sizes can be used, such as +35 mesh, but a point is reached where over-seeding or nucleation occurs easily and causes the final product yield to drop down."

It is also indicated at column 3, beginning at line 45 that:

"Seed material in the range of 20 mesh is the best single point for each of control and uniformity of product size distribution . . . ".

As is known, the larger the mesh numerical value the smaller the micron size of the particle. The following mesh sizes correspond to the stated micron sizes:

| Mesh Size | Approximate Micron Size |
| --- | --- |
| 12 | 1680 |
| 16 | 1190 |
| 20 | 840 |
| 30 | 590 |
| 40 | 420 |
| 100 | 149 |
| 200 | 74 |

Base on the teachings of the Derdall et al. disclosure, mesh sizes greater than +35 cause potential nucleation problems and result in a final product yield to decrease. With the technology disclosed, infra, it has been found that by using a fine powder of between −35 mesh to +150 mesh, that a superior quality product can be formed in high yield and typically in the range of a greater 90% When the above passage regarding Derdall et al. is considered, it is clear that Derdall et al. effectively contradict what the technology set forth herein has found to be particulary successful.

In the present application the size distribution of the nucleating material is between −35 mesh and +150 mesh which corresponds to micron size less than 590 μm and 105 μm, respectively. Nowhere in the prior art is a powdered nucleating agent in this size distribution disclosed for the purpose of forming a uniform granule in the size distribution of −8 mesh to +4 mesh. Advantages have ascribed to this process and one of the most attractive advantages is that the granule or pellet has an enormous break strength and a uniform cross section. It has been found by practicing the present invention, that break strengths in the range of 1 to 4 kgs or greater have been achieved.

In the Derdall et al. at column 3, beginning at line 33, it is stated:

"Seed of large size forms granules of very poor strength."

If one considers these teachings in light of the size of the nucleating agent provided herein, the admissions made in the Derdall et al. disclosure would clearly go against the appeal of using a seeding agent in the size range as clearly taught by Derdall et al. The instruction in Derdall et al. indicates that an ideal seeding agent size is 20 mesh (supra); the instant application uses a powder having a particle size between 75–750% smaller than Derdall et al. and yet achieve very desirable results.

In Statutory Invention Registration H1070, authored by Harrison et al., Jul. 7, 1992, a method for granulating potash materials is disclosed. The process involves the conversion of particulate potassium sulfate or potassium chloride by agglomeration using a conventional rotary drum granulator, pan granulator or other conventional granulating device.

In the disclosure of this document, there are no specific teachings regarding the elimination of a seeding agent, feedstock size or other important factors related to process control in order to generate superior quality granules having commercial viability. Further, the process clearly is an agglomeration process. It is known that agglomeration typically involves the aggregation of colloidal particles suspended in a liquid into clusters or flocs. These clusters or flocs have varying degrees of interstices and are loosely bound (Hawley's Condensed Chemical Dictionary, eleventh edition, 1987).

As a particularly advantageous feature of the present invention, the methodology herein facilitates sulfur granulation. With the effectiveness of air pollution regulations, it has now become necessary to augment the soil with sulfur due to deficiencies. As is generally known in agricultural science, sulfur fertilization increases crop yield and quality and further has an effect on nitrogen processing by plant matter. This processing is, in turn, related to protein synthesis, nitrogen fixation, photosynthesis and disease resistance.

Currently, sulfur pelletizing or granulation processes proceed according to dry synthesis methodology. This is extremely hazardous since sulfur, particularly sulfur dust, is explosive and difficult to handle. In view of these serious limitations, the field is in need of a viable and safe granulation process. The present technology set forth herein delineates a nonhazardous method for granulating sulfur, customizing particle size as well as additive addition to produce sulfur particles capable of slow release, pesticidal, herbicidal and bactericidal activity inter alia.

Wet granulation is inherently complicated, since irregular particle crystallography is inherently difficult to control. Wet powder is not uniform and this would lead to nonuniform accretion, over nucleation and eventual breakdown of the process. For these reasons among others, the art has not realized an effective and viable process for wet granulation.

Boeglin et al. in U.S. Pat. No. 3,853,490, discloses a granulation method for granulating potassium sulfate. The method involves the use of large particle starting material −6 +65 mesh (50%), −200 mesh (10% to 30%) and the remainder comprising −65 +200 mesh. In the disclosure it is stated that the granulation is carried out in conventional granulating equipment, however, there is no discussion concerning process control difficulties associated with pan granulation of the product. It is known from Derdall et al that significant difficulties are encountered in keeping the granulation steady even with seed material in the size range of +35 mesh. The most difficult problem is controlling "cycling" where the larger particles destroy the smaller particles. The Boeglin et al. reference would therefore appear to be directed solely to a drum granulation process where the complications inherent with pan granulation are not encountered.

In U.S. Pat. No. 3,711,254, issued to McGowan et al., there is discussed a process for granulating potash. The disclosure of the document only provides a cursory teaching of granulation and includes pan and drum granulation within the same process.

Kurtz, in U.S. Pat. No. 5,322,532, discloses a sodium bicarbonate blast media. The blast media comprises an agglomeration of sodium bicarbonate and sodium sesquicarbonate. The reference does not set forth any details with respect to any other formulation process apart from agglomeration and lacks instruction regarding any other material for augmentation.

Other patent documents of only marginal relevance include the following U.S. Pat. Nos.: 4,371,481; 4,131,668; 4,264,543; 5,108,481; 3,206,508; 3,206,528; 4,344,747; and, 5,124,104, The prior art, when taken singly or collectively, is deficient any clear teachings regarding the preparation of fertilizer, blasting, deodorizer or water softener granules having the following commercial and industrial advantages:

a) uniform cross section;

b) tightly packed feedstock;

c) absence of a seed or crystal core;

d) increased break strength relative to the prior art;

e) material homogeneity throughout the granule; and f) greater quantity of feedstock material per granule There has been a long felt need for granules having these desirable properties and for methodology to effect synthesis of such products; the present invention addresses these needs in an elegant and efficacious manner.

SUMMARY OF THE INVENTION

One object of the present invention is to provide an improved method for generating a variety of industrially useful particles or granules, which particles are devoid the drawbacks of the prior art techniques.

A further object of one embodiment of the present invention is to provide a wet granulation method for granulating a fertilizer feedstock into granules, comprising the steps of:

providing a fertilizer feedstock having about 99.9% particle size of −150 mesh of the 99.9% particle size of −150 mesh about 90% comprising a particle size of −200 mesh;

providing a binder material in an amount of about 6% to about 8% by weight;

contacting the fertilizer feedstock with the binder on a pan granulator under moisture conditions where the moisture content on the pan is between about 1.5% to about 11% by weight; and forming fertilizer granules on the pan directly from the feedstock in the absence of seed or nucleating material.

In the present invention, the maintenance of moisture on the pan and in the product substantially prevents dust formation during product synthesis. This is augmented by the addition of oil e.g. mineral, vegetable, seed, synthetic, etc. to the final product. As a further feature, plant nutrients, growth regulators, minerals, time release compositions and suitable bacteria may be included in the granules. In terms of the nutrients, suitable examples include copper, boron, selenium and nitrogen; the growth regulators may be herbicides, pesticides, hormones; the minerals will vary depending on soil and environment conditions, but may include copper, boron and other metals; the time release materials may be selected to release the sulfur only at specific times during the growth cycle of the plant, crop, etc.; bacteria may be selected from a diverse variety depending on the specific requirements of the user. To this end, sulfur oxidizing bacteria may be selected, disease combating bacteria to reduce the vulnerability of the crop etc.

As another feature of the present invention, the technology can be easily employed in the granulation of pellets/granules used in other fields outside of the agricultural sciences.

The important inventive concept of the present invention is the ability to generate particles/granules in the absence of a seeding agent. In this manner, the process can be loosely referred to as a pan nucleation process; the process proceeds generally as crystallization, i.e., a nucleation site accretes the surrounding material. With the present technology, the pan rotation and binder assist in the material accretion around the nucleation site to produce a tightly packed granule with high feedstock content.

Having thus described the invention, reference will now be made to the accompanying drawing illustrating preferred embodiments.

BRIEF DESCRIPTION OF THE DRAWINGS

Similar numerals employed in the text denote similar elements.

DETAILED DESCRIPTION OF THE PREFERRED EMBODIMENTS

Prior to the explanation of the method, the following table sets forth some general properties of the compounds and materials that may be granulated.

TABLE 1

GENERAL PROPERTIES

| COMPOUND | CRYSTALS | SOLUBILITY | MELTING POINT (C) | BOILING POINT (C) | HAZARDS |
|---|---|---|---|---|---|
| Ammonium Nitrate - $NH_4NO_3$ | colorless | soluble in water, alcohol and alkalies | 169.6 | Decomposes at 210 | may explode if confined and exposed to high temperature |
| Ammonium Sulfate - $(NH_4)_2SO_4$ | brownish white to gray | soluble in water | 513 | | none |
| Potassium Chloride - KCl | colorless or white | soluble in water; slightly soluble in alcohol | 772 | sublimes at 1500 | none |
| Potassium Nitrate $KNO_3$ | transparent, colorless or white; powder or crystalline | soluble in water or glycerol; slightly soluble in alcohol | 337 | decomposes at 400 | fire/ explosion risk upon shock or heating or when in contact with organic materials |
| Potassium Sulfate $K_2SO_4$ | colorless or white hard crystals or powder | soluble in water | 1072 | | none |
| Sulfur- S | alpha form rhombic, octahedral yellow crystals; beta form monoclinic, prismatic pale yellow crystals | slightly soluble in alcohol and ether, soluble in carbon disulfide, carbon tetrachloride and benzene | alpha approx 94.5 Beta approx 119 | | combustible in finely divided form a fire and explosion risk exists |
| Urea $CO(NH_2)_2$ | white crystals or powder | soluble in water alcohol and benzene | 132.7 | Decomposes | none |
| Sodium Bicarbonate $NaHCO_3$ | white powder or crystalline lumps | soluble in water | loses carbon dioxide at 270 | | none |

Figure 1:
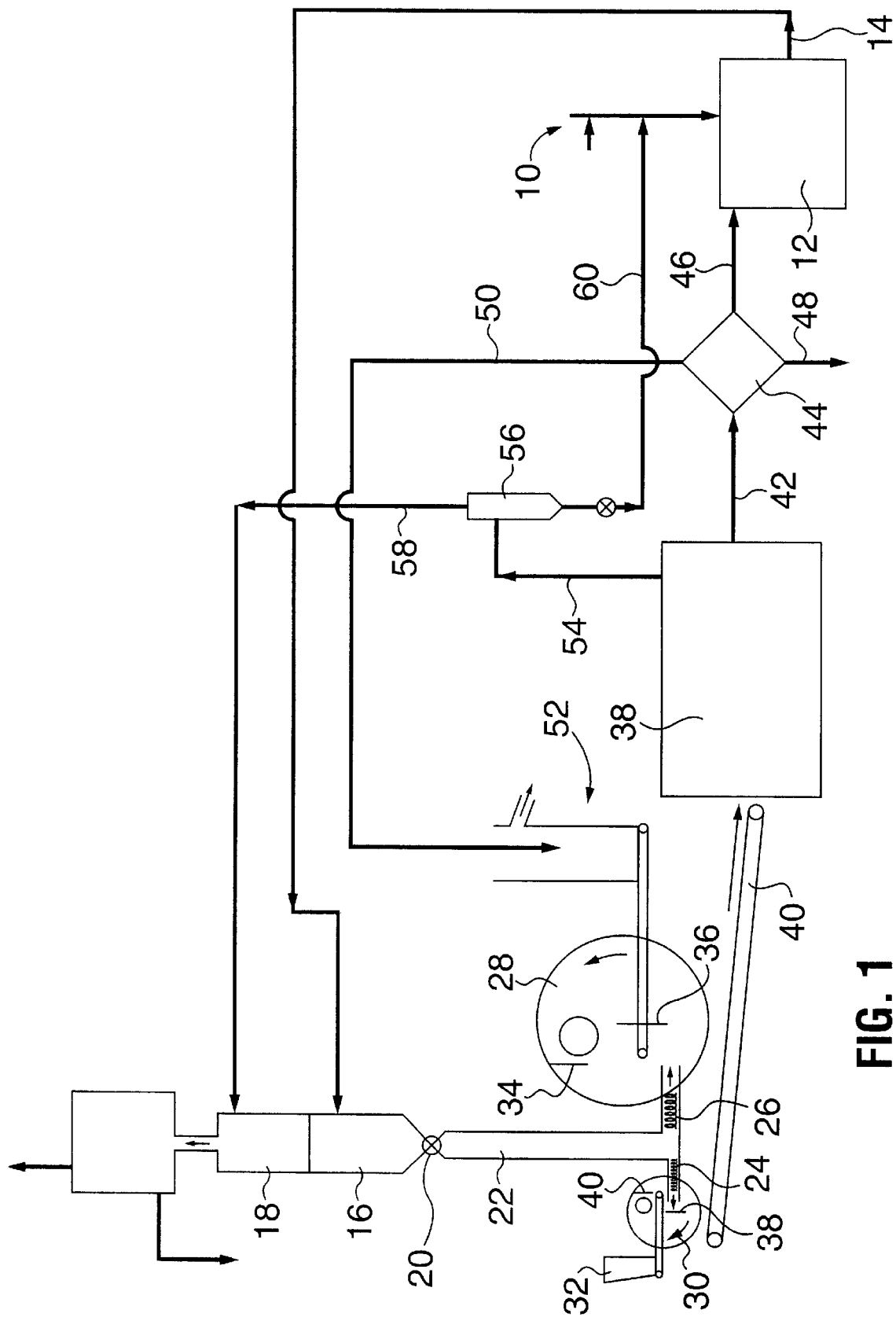
FIG. 1 illustrates a schematic representation of the method according to one embodiment of the present invention.

Referring now to FIG. 1, shown is an overall schematic representation of the process according to one embodiment.

In the embodiment shown, the circuit is representative of a ten ton per hour circuit. Reference numeral 10 denotes the introduction of feedstock which may be any suitable material, numerous examples of which have been indicated supra. The technology set forth herein permits the formation of most any granulated product including various sulfates, soda ash, sulfur, potash, kaolin, magnesia, potassium sodium and ammonium chloride inter alia.

The feed may be introduced at 9.8 tons per hour (9.8 thr$^{-1}$) along with suitable binder material as set forth herein previously. The feedstock and binder may be then introduced into a pulverizer 12 to pulverize the feedstock such that a product is produced having 99.9% –150 mesh and at least 90% –200 mesh. The pulverizer 12 may be a classifying pulverizer or air sweep pulverizer or any other suitable pulverizer known by those skilled in the art. Once pulverized, the stream, generally represented by numeral 14, is introduced into a sealed collection hopper, globally denoted by numeral 16, which includes a bag house 18 to collect dust. Collection hopper 16 includes suitable valve 20 for metering dust into a collection bin 22. The bin 22 is mounted over two feeders 24 and 26 which divide the material being received from bin 22 into two streams, the first stream being fed by feeder 26 to a wet mixer (not shown) and then to a first large pan granulator 28 at a rate of 7.6 tons per hour (7.6 thr$^{-1}$), as an example, while feeder 24 feeds a second stream into a paddle or pin mixer (not shown) and then to a second pan granulator 30, being smaller than granulator 28. The feed rate to the small pan may be 2.8 tons per hour (2.8 thr$^{-1}$), as an example, to be consistent with a ten ton per hour circuit. The mixers each contain a mixture of binder and feedstock with a moisture content in the range of 4% to about 8% by weight. The material fed from the mixers to the pans is thus wet and this avoids dust formation during processing. The amount of moisture in the binder is a variable factor and is dependent upon the nature of the binder (solid/moisture content). Clearly, high moisture content binders will not require as great an addition (on a percentage by weight basis) to the mixers as the lower moisture content binders.

Pan 30 is equipped with a small receptacle 32 for retaining –35 mesh dry raw feedstock (not shown). The receptacle 32 is equipped with a variable rate metering apparatus (not shown). The feeder removes the material from the receptacle 32 and introduces the dry raw feedstock into pan 30. As is known in the art, the pan granulators 28 and 30 include upper and lower scrapers 34, 36 and 38, 40, respectively. Regarding the feedstock from receptacle 32, the same is introduced to the pan 30 behind top scraper 38. In this example, the production rate for the pan 30 would be set for 3 tons per hour (3 thr$^{-1}$) with a size distribution of approximately 80% product between –8 mesh to +20 mesh. It has been found that this is achievable by combining the raw feedstock to the dust at a ratio of 1:20 to 1:100 parts. The use of an atomizing hot binder solution at any position from the 12 o'clock through to the 5 o'clock position has been found to be particularly useful. When the correct free moisture is attained, generally between 1.5% to about 11%, the first pan stabilizes at a steady state condition. In this manner, granules are formed directly on pan 30 in the absence of a seeding agent.

As indicated above, the product formed from pan 30 is typically between 50 to 80% –8 mesh. The product is discharged and dried with dryer 38. Dryer 38 may be selected from, for example, Carrier dryers, tray dryers or roto louver type dryers. The product being formed in large pan 28 is additionally transported to dryer 38 via a suitable conveyer, globally denoted by numeral 40.

Product exiting dryer 38 via stream 42 is then screened by a suitable screening arrangement 44 at 4 mesh, 8 mesh and 20 mesh. The +4 and –20 mesh portions are sent to pulverizer 12 for recycling into the system, the recycling stream being indicated by numeral 46. The –4 to +8 mesh portion is the final product and leaves screen 44, as indicated by numeral 48, as a final finished product. The –8 to +20 mesh portion is sent via stream 50 to a hopper equipped with a weigh belt feeder, broadly denoted by numeral 52. The material is advanced from the weigh belt feeder 52 into pan 28 whereupon the product is further processed by the introduction of binder and additional dust to produce a desired granule product. This is an optional step dependent upon whether further feedstock accretion is desired.

Any residual dust which may be present in dryer 38 may be passed via line 54 for exiting dryer 38 to hopper 56 and the collected material in hopper 56 either passed onto the bag house 18 via line 58 or passed into the feedstock via line 60. The fines or dust entering bag house 18 may additionally be passed off onto ancillary operations, for example, wet scrubbing, as broadly denoted by numeral 60 in FIG. 1. Other examples will be readily apparent to those skilled in the art.

The ratio of –8 to +20 mesh product needed to run pan 28 at a steady state has been found to be, for the system described herein, between 1:10 to 2:5, an optimum of 1:5. Pan 28 stabilizes quickly and produces yields of greater than 95% on +8 to –4 mesh. The process yield from the overall circuit as set forth herein exceeds 90%. As discussed briefly herein previously, 10% of the weight, which is in the –20 and +4 mesh size distribution, as well as dryer dusts, can be recycled to enhance the efficiency and productivity of the method to produce maximum yields at very low cost.

With further reference to the pans 28 and 30, as is known, the pans may be adjusted for angle and rotational speed such that the +8 to –4 mesh granules are only produced. In addition, it has been found advantageous to not only change the horizontal disposition of the pans, but also to laterally tilt the pans to enhance the efficiency of the granulating process. The specific angle of tilt and horizontal angle will be dependent upon the rotational speed and the size of the granule desired to be produced. As a variation, the tilt and/or angular velocity of the pan(s) may be adjusted to produce granules in the size distribution of –10 mesh to about 100 mesh.

It will be appreciated that the method for operation as discussed can be a single operation or may be incorporated into a unit operation within a series of other operations. This will depend upon the specific needs of the user.

It will also be readily appreciated that any number of pans can be incorporated into the system to progressively grow or accrete a granule. To this end, the process is interruptible and therefore can be custom designed to produce granules having a variety of layers of material to produce a host of valuable granules. It will be clear to those skilled in the art that the process is effective for producing a number of different forms of fertilizer and has particular utility with respect to the formation of high grade fertilizer for use on golf courses, time release formulae etc.

In terms of the binder, suitable example include lignosol, sugars, saturated salts and proteins, water, calcium sulfate, sodium sulfate, potassium chloride, dry gluttens, wheat grains, barley grains, rice grains and calcium phosphate among others. The choice of the binder will depend on the desired characteristics of the granule and accordingly, the aforementioned examples are only exemplary. In the instance where the material to be granulated is dangerous or has the characteristic of having explosive dust, the binder composition may comprise a high moisture content, generally 30% to 60% moisture or greater with the balance comprising solids. It is also contemplated that mixtures of binder material may be employed. In the case when the binder contains 60% solids, then approximately 5% by weight binder may be employed in the process.

With respect to the feedstock and binder, where the binder contains a higher moisture content, the use of an atomizer for dispensing moisture on to pans 28 and/or 30 may not be necessary. In a further variation, binder and feedstock material may be added to the pan(s) simultaneously. These process variations will be dependent upon the nature of the material to be pelletized or granulated.

Figure 2:
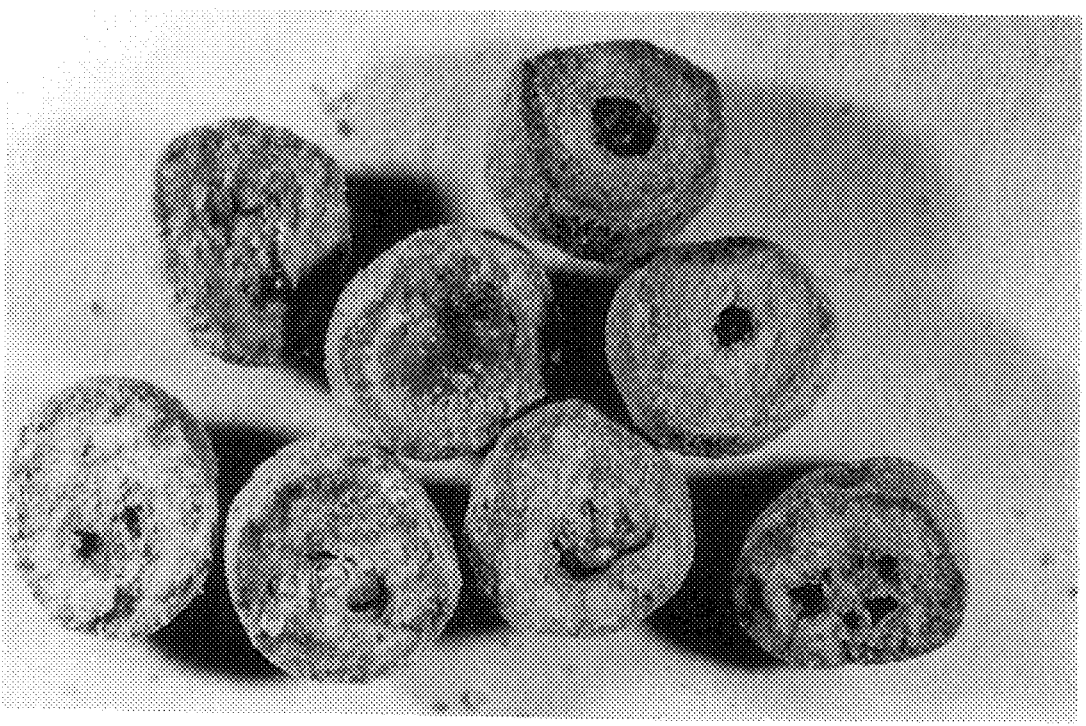
FIG. 2 is a photograph of a sulfur granule in cross section formulated by practicing the prior art methodology.

Referring now to the photographs, FIG. 2 illustrates granulated sulfur pellets with an ammonium sulfate core created by the prior art technique as taught by Derdall et al. The pellets clearly include a sizeable core occupying a large amount of the volume of the particle. It is also evident that the cross section of the particles is nonuniform and in some cases hollow in localized areas. In addition, the particles are not spherical, but rather substantially aspherical. These factors all depreciate the quality and industrial value of the particles.

Figure 3:
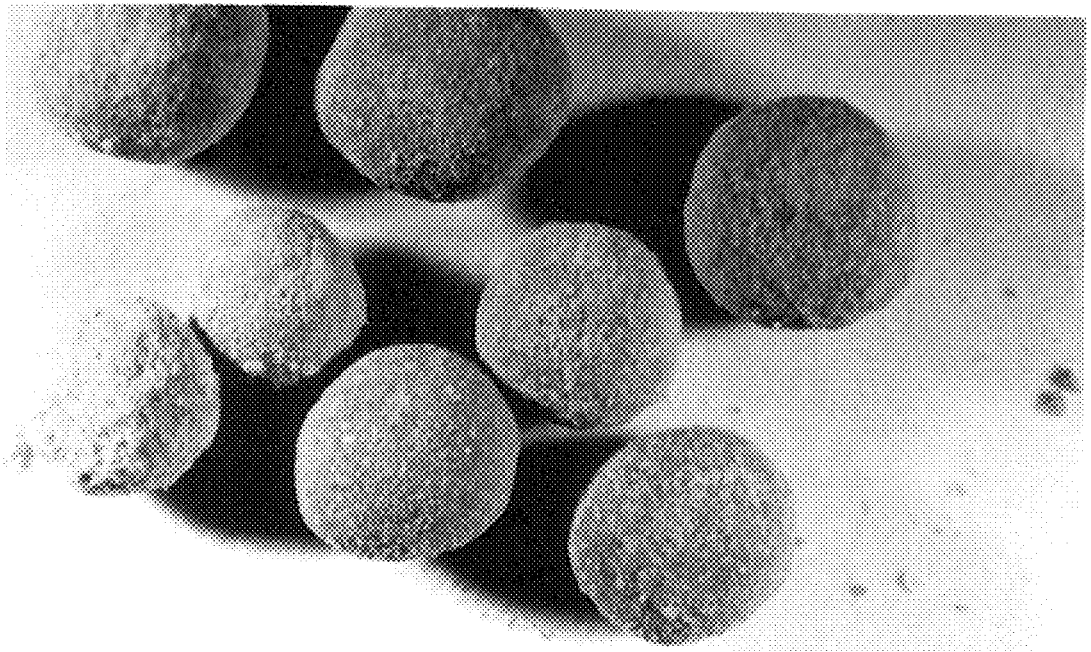
FIG. 3 is a photograph of the sulfur granule of FIG. 2.

FIG. 3 shows whole granulated sulfur pellets synthesized in accordance with the Derdall et al. methodology. As is evident from the figure, the exterior of the granules is loose to provide a grainy surface texture. This lack of consolidation of the material results in the generation of dust which, as indicated supra, creates significant handling problems and in particular, increases the likelihood of a potential explosion.

Figure 4:
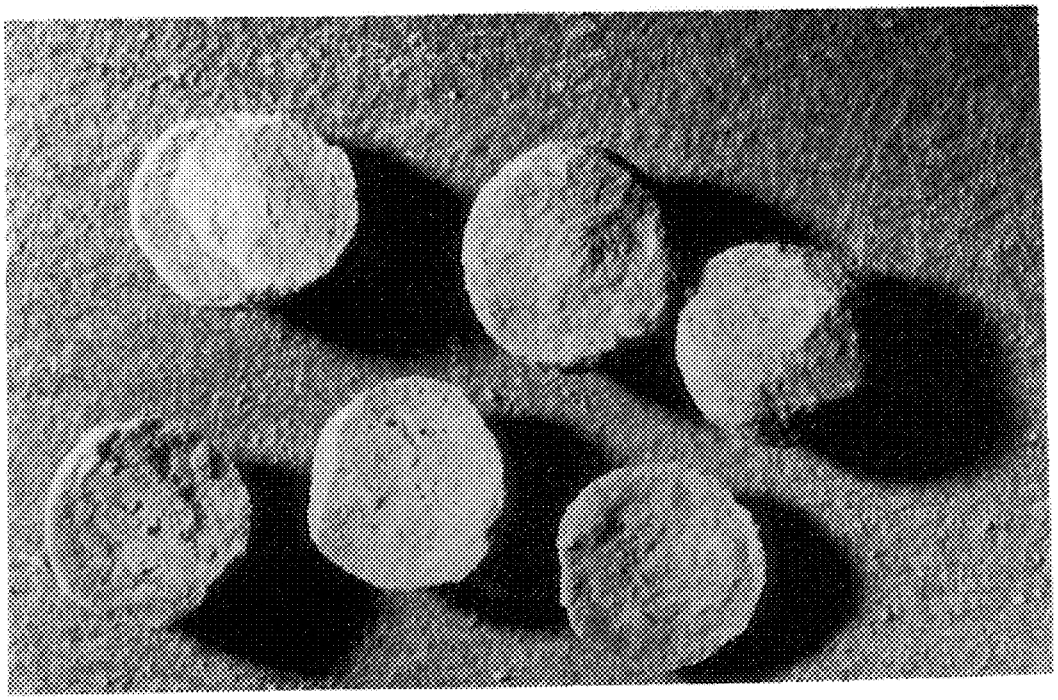
FIG. 4 is a photograph of sulfur granules in cross section formulated by practicing the methodology of one embodiment the present invention.
Figure 5:
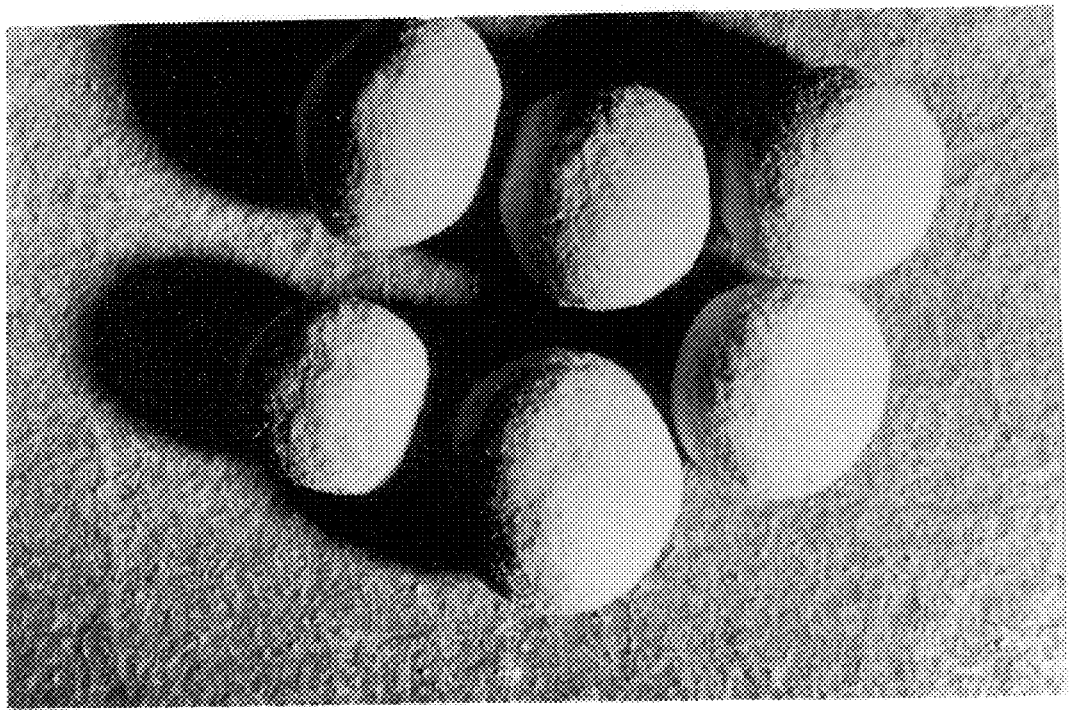
FIG. 5 is a photograph of the sulfur granules of FIG. 4.

In contrast to the above, FIGS. 4 and 5 demonstrate the high quality particles generated by the present methodology. Of particular significance is the fact that the particles/granules are completely devoid of any core or seed, but rather are entirely uniform, continuous and solid throughout. FIG. 5 illustrates the granules in toto. It is readily apparent that the granules have a different surface appearance than those formulated by the prior art; this is further evinced by the lack of dust or grains surrounding the particles. The particles are significantly more consolidated, harder, tightly packed and include a greater amount of feedstock (at least 95% by weight) than the prior art granules. Accordingly, the advantages enumerated herein previously are realized.

Figure 6:
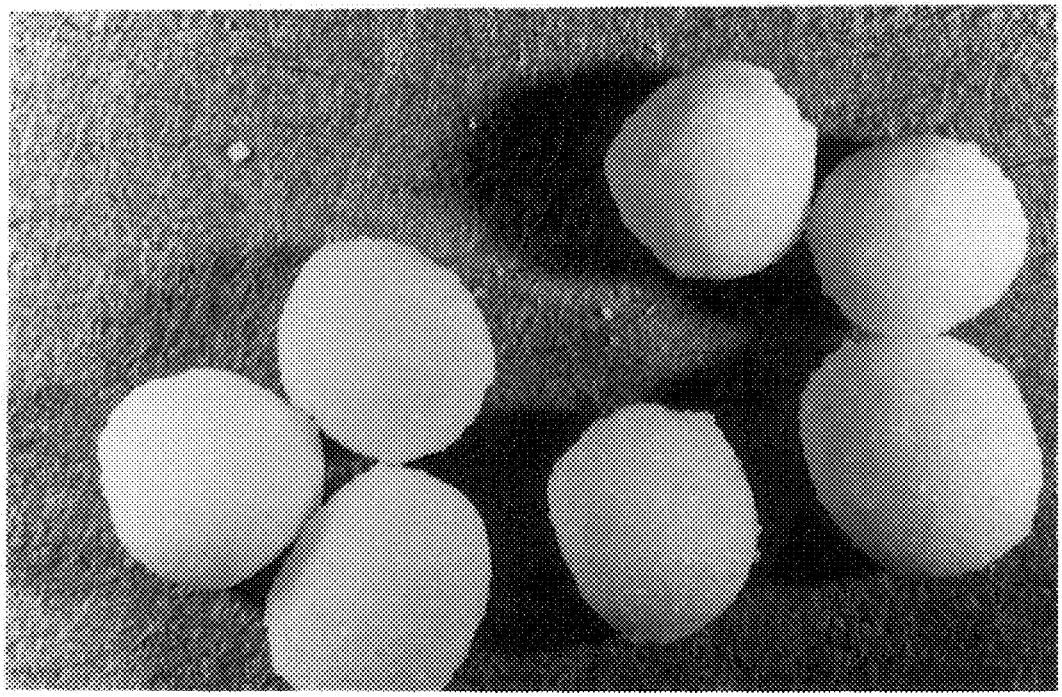
FIG. 6 is a photograph of a potassium chloride granules formulated by practicing the methodology of the prior art.
Figure 7:
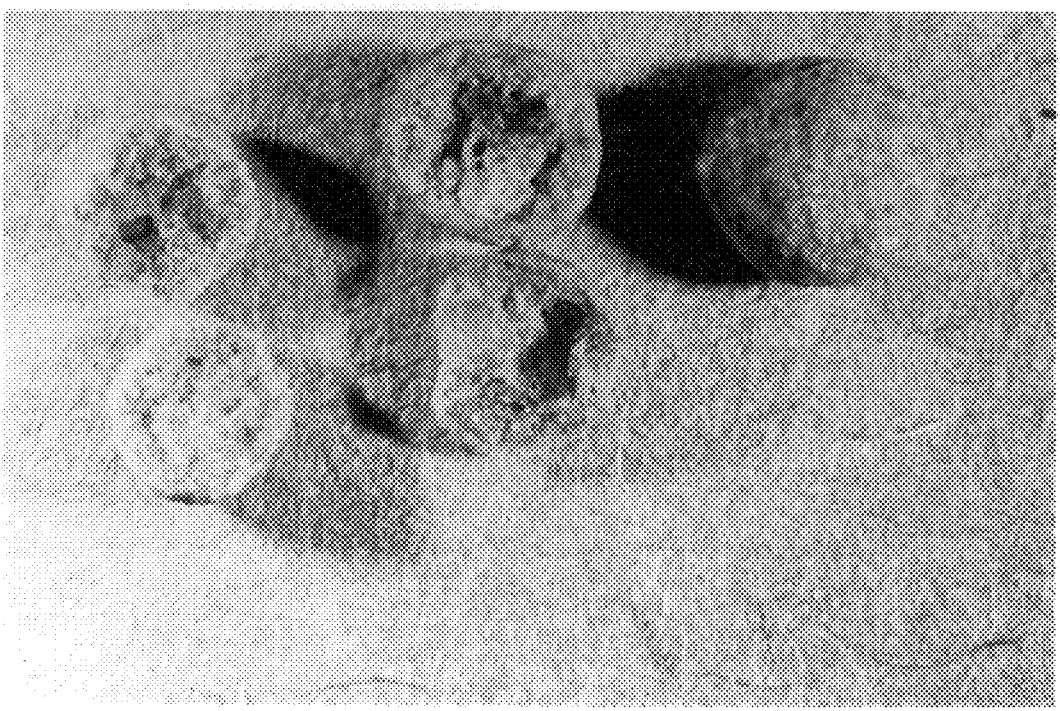
FIG. 7 is a photograph of red potassium chloride granules in cross section formulated by practicing the prior art methodology.

In respect of FIGS. 6 and 7, shown are potassium chloride granules made by the technique set forth by Derdall et al. The Figures illustrate two different forms of the compound and confirm the presence of the seed indicated as a critical factor to the generation of the particles.

Figure 8:
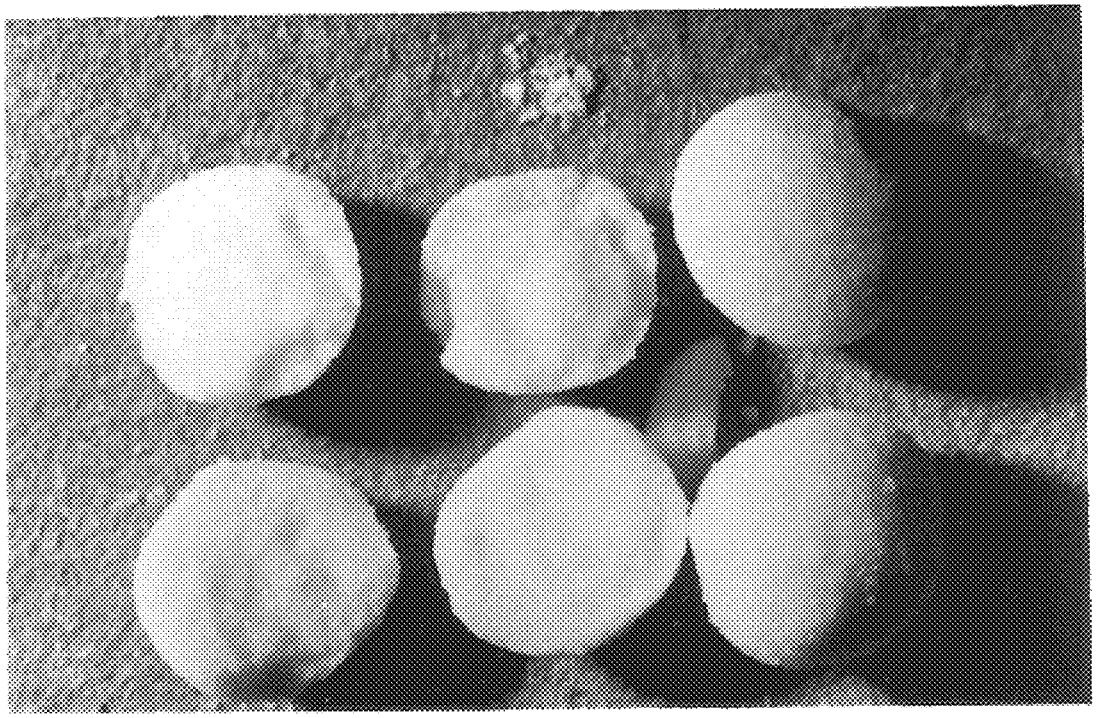
FIG. 8 is a photograph of potassium chloride granules in cross section formulated by practicing the methodology of one embodiment of the present invention.
Figure 10:
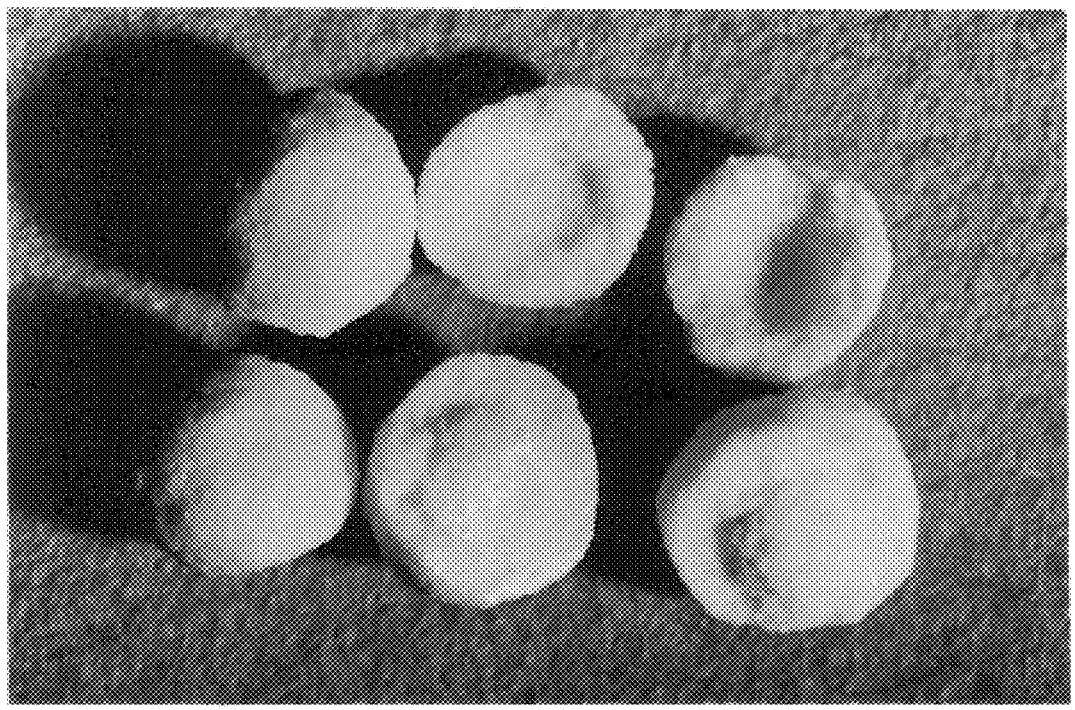
FIG. 10 is a photograph of potassium chloride granules containing sulfur and formulated by practicing the methodology of one embodiment of the present invention.
Figure 1:
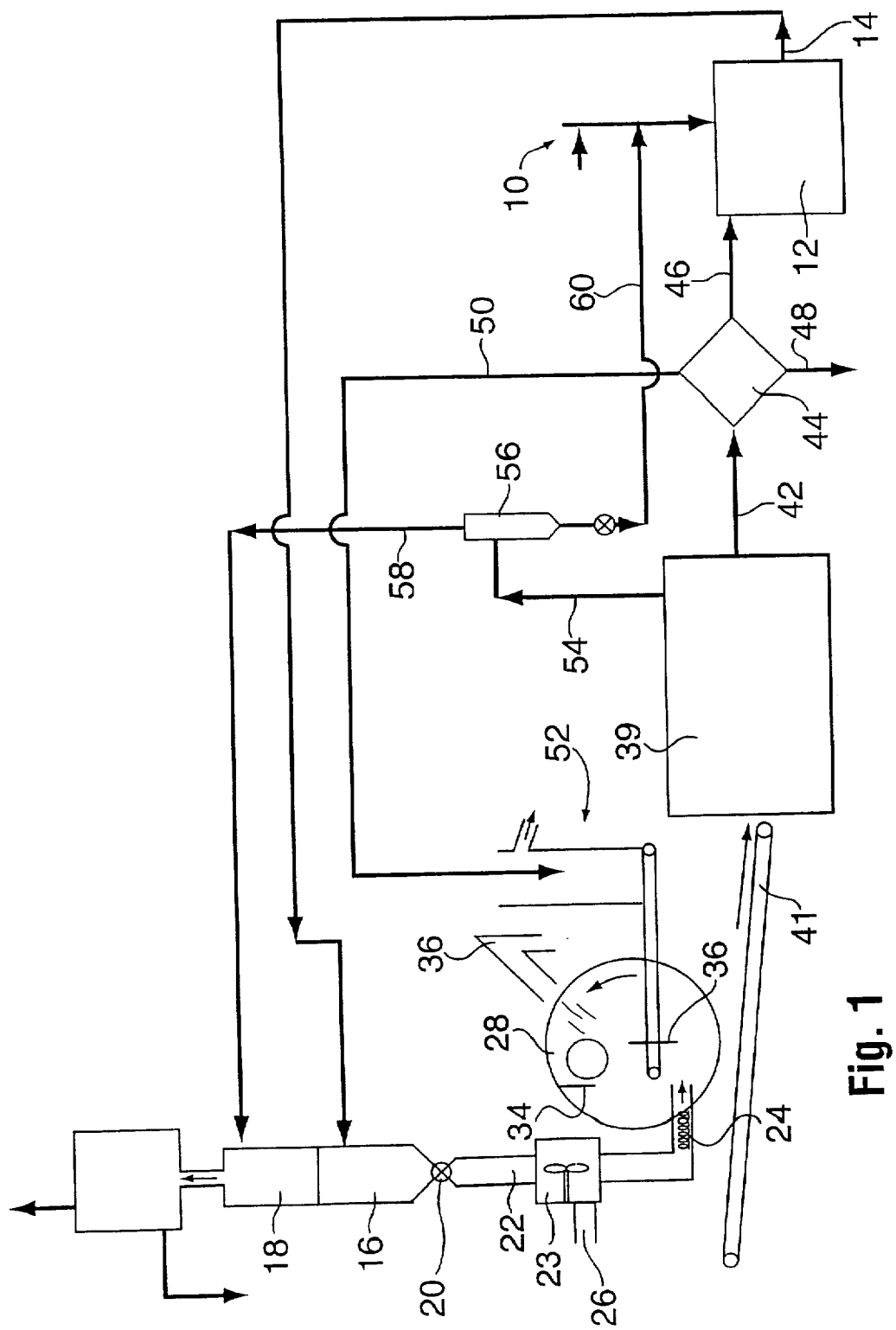

With reference to FIGS. 8 and 10, shown are potassium chloride particles formulated by practicing the methodology of one embodiment of the invention. As illustrated, the particles are substantially spherical, devoid any core and lack the surface graininess of the particles of FIG. 6. The particles illustrated include a sulfur compound.

Figure 9:
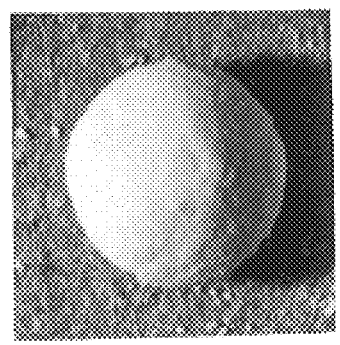
FIG. 9 is a photograph of a potassium chloride granule illustrated in FIG. 8.

FIG. 9 illustrates a sodium bicarbonate granule granulated by practicing the technology set forth herein. Noteworthy is the spherical appearance and consolidation of the particle.

The inventive technology established herein affords a commercially viable and industrially significant development in the granulation art affording pellet content customization among other features.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A wet granulation method for granulating a fertilizer feedstock into granules, comprising the steps of:

providing a first powdered fertilizer feedstock having about 99.9% particle size of −150 mesh of said 99.9% particle size of −150 mesh about 90% consisting of a particle size of −200 mesh;

providing a second powdered feedstock differently sized from said first feedstock in a size distribution of between −35 mesh and +150 mesh;

providing a binder material;

contacting said first powdered feedstock with said second powdered feedstock in a ratio of between 1 to 20 and 1 to 100 with said binder in an amount of between 6% to about 8% by weight on a pan granulator;

maintaining moisture conditions on said pan to a level of between 1.5% and 11% by weight; and forming fertilizer granules on said pan directly from said first feedstock in the absence of seed material.

2. The method as set forth in claim 1, wherein said moisture content is between about 1.5% and about 10.5%.

3. The method as set forth in claim 2, wherein said moisture content is about 8%.

4. The method as set forth in claim 1, wherein said fertilizer granules are in the size range of −10 mesh to 100 mesh.

5. The method as set forth in claim 4, said method producing at least a 90% yield.

6. The method as set forth in claim 1, further including the step of passing said granules on to a second pan granulator.

7. The method as set forth in claim 1, wherein said first powdered feedstock is selected from the group comprising potassium sulfate, potassium chloride, potassium nitrate, ammonium sulfate, ammonium nitrate and sulfur.

8. The method as set forth in claim 1, wherein said binder comprises about 60% moisture and about 40% solids.

9. The method as set forth in claim 1, wherein said binder is dry, said moisture content comprising water added to said pan.

10. The method as set forth in claim 6, wherein feedstock for said second pan includes between about 20% to about 35% product in the size range of −10 mesh to about 100 mesh.

11. The method as set forth in claim 10, wherein product from said second pan comprises granules in the size range from about −4 mesh to about −8 mesh.

12. The method as set forth in claim 1, further including the step of adding an oil to formed granules for dust control prior to further processing.

13. The method as set forth in claim 12, wherein said oil comprises an oil selected from canola oil, vegetable oil, mineral oil.

14. A fertilizer granule made in accordance with the process of claim 1.

15. The fertilizer granule as set forth in claim 14, wherein said fertilizer granule comprises ammonium sulfate.

16. The fertilizer granule as set forth in claim 14, wherein said fertilizer granule comprises ammonium nitrate.

17. The fertilizer granule as set forth in claim 14, wherein said fertilizer granule comprises potassium chloride.

18. The fertilizer granule as set forth in claim 14, wherein said fertilizer granule comprises potassium sulfate.

19. The fertilizer granule as set forth in claim 14, wherein said fertilizer granule comprises sulfur.

20. A wet granulation method for granulating a fertilizer feedstock into granules, comprising the steps of:

providing a first powdered fertilizer feedstock having about 99.9% particle size of −150 mesh of said 99.9% particle size of −150 mesh about 90% consisting of a particle size of −200 mesh;

providing a second powdered feedstock different from said first feedstock in a size distribution of between −35 mesh and +150 mesh;

providing a binder material;

contacting said first powdered feedstock with said second powdered feedstock in a ratio of between 1 to 20 and 1 to 100 with said binder in an amount of between 6% to about 8% by weight on a pan granulator;

maintaining moisture conditions on said pan to a level of between 1.5% and 11% by weight;

forming first fertilizer granules in a size distribution of between −10 mesh to +100 mesh on said pan directly from said first feedstock in the absence of seed material;

treating said first fertilizer granules in a second pan granulator with said binder and said first powdered feedstock; and forming second fertilizer granules in a size distribution different from said size distribution of said first fertilizer granules.

21. A wet granulation method for granulating a fertilizer feedstock into granules, comprising the steps of:

providing a first powdered fertilizer feedstock having about 99.9% particle size of −150 mesh of said 99.9% particle size of −150 mesh about 90% consisting of a particle size of −200 mesh;

providing a second powdered feedstock in a size distribution of between −35 mesh and +150 mesh;

providing a binder material;

contacting said first powdered feedstock with said second powdered feedstock in a ratio of between 1 to 20 and 1 to 100 with said binder in an amount of between 6% to about 8% by weight on a pan granulator;

maintaining moisture conditions on said pan to a level of between 1.5% and 11% by weight; and forming fertilizer granules on said pan directly from said first feedstock in the absence of seed material.

* * * * *

UNITED STATES PATENT AND TRADEMARK OFFICE
CERTIFICATE OF CORRECTION

PATENT NO : 6,132,484
DATED : October 17, 2000
INVENTOR(S): Robin Phinney

It is certified that error appears in the above-identified patent and that said Letters Patent is hereby corrected as shown below:

Please amend Column 7 at Line 59 to delete "dryer 38". "Dryer 38" and insert therefor - - dryer 39. Dryer 39. - -

Please amend Column 7 at Line 62 to delete "dryer 38" and insert therefor - - "dryer 39". - -

Please amend Column 7 at Line 63 to delete "numeral 40" and insert therefor - - numeral 41. - -

Please amend Column 7 at Line 64 to delete "Product exiting dryer 38" and insert therefor - - Product exiting dryer 39. - -

Please amend Column 8 at Line 11 to delete "Present in dryer 38" and insert therefor - - Present in dryer 39. - -

In the Drawings, please substitute drawing sheet 1 of 6 consisting of FIG. 1 with attached drawing sheet 1 of 6.

Signed and Sealed this

Seventeenth Day of April, 2001

*Attest:*

NICHOLAS P. GODICI

*Attesting Officer*      *Acting Director of the United States Patent and Trademark Office*